United States Patent
Wang et al.

(10) Patent No.: US 9,678,594 B2
(45) Date of Patent: Jun. 13, 2017

(54) IN-CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Lei Wang, Beijing (CN); Xue Dong, Beijing (CN); Hailin Xue, Beijing (CN); Haisheng Wang, Beijing (CN); Yingming Liu, Beijing (CN); Shengji Yang, Beijing (CN); Hongjuan Liu, Beijing (CN); Xiaoliang Ding, Beijing (CN); Weijie Zhao, Beijing (CN); Chunlei Wang, Beijing (CN); Yue Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/443,286

(22) PCT Filed: Sep. 20, 2014

(86) PCT No.: PCT/CN2014/087007
§ 371 (c)(1),
(2) Date: May 15, 2015

(87) PCT Pub. No.: WO2015/180316
PCT Pub. Date: Dec. 3, 2015

(65) Prior Publication Data
US 2016/0274715 A1    Sep. 22, 2016

(30) Foreign Application Priority Data

May 30, 2014   (CN) .......................... 2014 1 0241132

(51) Int. Cl.
*G06F 3/041*        (2006.01)
*G02F 1/13*         (2006.01)
(Continued)

(52) U.S. Cl.
CPC .............. *G06F 3/0416* (2013.01); *G02F 1/13* (2013.01); *G02F 1/133* (2013.01); *G02F 1/1333* (2013.01);
(Continued)

(58) Field of Classification Search
CPC ................... G06F 3/0412; G06F 3/044; G06F 2203/04103; G06F 3/041; G06F 3/0416;
(Continued)

(56) References Cited

U.S. PATENT DOCUMENTS 7,859,521 B2 * 12/2010 Hotelling .............. G06F 3/0412
                                              178/18.03
8,901,944 B2 * 12/2014 Chai ....................... G06F 3/044
                                              324/658
(Continued)

FOREIGN PATENT DOCUMENTS

CN        102314248 A    1/2012
CN        102841718 A   12/2012
(Continued)

OTHER PUBLICATIONS

International Search Report Appln. No. PCT/CN2014/087007, Dated Feb. 26, 2015.
(Continued)

*Primary Examiner* — Dmitriy Bolotin
(74) *Attorney, Agent, or Firm* — Ladas & Parry LLP (57) ABSTRACT

An in-cell touch panel and a display device are disclosed, a common electrode layer is reused as self-capacitance elec-
(Continued)

trodes in accordance with self-capacitance principle. A pattern of common electrode layer is designed such that the common electrode layer is partitioned into a plurality of mutually independent self-capacitance electrodes along strip-like slits and a direction crossing the slits. The touch sensing chip can determine a touch position by detecting capacitance value variation of self-capacitance electrodes in a touch period. The in-cell touch panel can save production costs and improve production efficiency, and also can avoid light leakage caused by cutting common electrode layer and influence on display effect.

9 Claims, 8 Drawing Sheets (51) Int. Cl.
| | | |
|---|---|---|
| *G02F 1/133* | (2006.01) | |
| *G02F 1/1333* | (2006.01) | |
| *G06F 3/044* | (2006.01) | |
| *G06F 3/046* | (2006.01) | |
| *G02F 1/1335* | (2006.01) | |
| *G02F 1/1343* | (2006.01) | |
| *G02F 1/1362* | (2006.01) | |
| *G02F 1/1368* | (2006.01) | |
| *G09G 3/36* | (2006.01) | |

(52) U.S. Cl.
CPC ........ *G02F 1/1368* (2013.01); *G02F 1/13338* (2013.01); *G02F 1/13439* (2013.01); *G02F 1/133345* (2013.01); *G02F 1/133512* (2013.01); *G02F 1/136286* (2013.01); *G06F 3/041* (2013.01); *G06F 3/044* (2013.01); *G06F 3/046* (2013.01); *G06F 3/0412* (2013.01); *G09G 3/3648* (2013.01); *G09G 3/3677* (2013.01); *G09G 3/3688* (2013.01); *G02F 2001/134345* (2013.01); *G06F 2203/04103* (2013.01); *G06F 2203/04111* (2013.01); *G06F 2203/04112* (2013.01); *G09G 2300/0809* (2013.01); *G09G 2310/0202* (2013.01); *G09G 2354/00* (2013.01)

(58) Field of Classification Search
CPC ... G06F 2203/0411; G06F 2203/04112; G06F 3/046; G06F 2203/04111; G02F 1/13338; G02F 1/133345; G02F 1/133512; G02F 1/13439; G02F 1/136286; G02F 1/1368; G02F 2001/134345; G02F 1/13; G02F 1/133; G02F 1/1333; G09G 2300/0809; G09G 2310/0202; G09G 3/3677; G09G 3/3688; G09G 3/3648; G09G 2354/00
USPC ................ 345/173, 174, 55, 90; 178/18.03; 349/12; 445/24
See application file for complete search history.

(56) References Cited

U.S. PATENT DOCUMENTS

| | | | | |
|---|---|---|---|---|
| 8,970,537 | B1* | 3/2015 | Shepelev | G06F 3/044 178/18.01 |
| 2010/0194697 | A1* | 8/2010 | Hotelling | G06F 3/0412 345/173 |
| 2010/0194699 | A1* | 8/2010 | Chang | G06F 3/044 345/173 |
| 2010/0214247 | A1 | 8/2010 | Tang et al. | |
| 2010/0214260 | A1 | 8/2010 | Tanaka et al. | |
| 2011/0096025 | A1 | 4/2011 | Slobodin et al. | |
| 2012/0044171 | A1 | 2/2012 | Lee et al. | |
| 2014/0028616 | A1 | 1/2014 | Furutani et al. | |
| 2014/0055412 | A1 | 2/2014 | Teramoto | |
| 2014/0104510 | A1 | 4/2014 | Wang et al. | |
| 2014/0132560 | A1 | 5/2014 | Huang et al. | |
| 2014/0146013 | A1 | 5/2014 | Noguchi et al. | |
| 2014/0176465 | A1 | 6/2014 | Ma et al. | |
| 2014/0320767 | A1 | 10/2014 | Xu et al. | |
| 2014/0327654 | A1 | 11/2014 | Sugita et al. | |
| 2014/0362031 | A1 | 12/2014 | Mo et al. | |
| 2015/0277655 | A1* | 10/2015 | Kim | G06F 3/0412 345/174 |
| 2015/0293639 | A1 | 10/2015 | Furutani et al. | |
| 2016/0026330 | A1 | 1/2016 | Shepelev et al. | |
| 2016/0048233 | A1* | 2/2016 | Wang | G06F 3/0412 345/174 |
| 2016/0195962 | A1 | 7/2016 | Miyazaki et al. | |
| 2016/0306454 | A1 | 10/2016 | Wang et al. | |

FOREIGN PATENT DOCUMENTS

| | | |
|---|---|---|
| CN | 102955635 A | 3/2013 |
| CN | 202854779 U | 4/2013 |
| CN | 202887154 U | 4/2013 |
| CN | 202976049 U | 6/2013 |
| CN | 103186307 A | 7/2013 |
| CN | 103279245 A | 9/2013 |
| CN | 103293785 A | 9/2013 |
| CN | 103383612 A | 11/2013 |
| CN | 103472961 A | 12/2013 |
| CN | 103677454 A | 3/2014 |
| CN | 103793120 A | 5/2014 |
| CN | 203606816 U | 5/2014 |
| CN | 10402891 A | 9/2014 |
| CN | 104020893 A | 9/2014 |
| CN | 104020906 A | 9/2014 |
| CN | 104020907 A | 9/2014 |
| CN | 104020909 A | 9/2014 |
| CN | 104020910 A | 9/2014 |
| CN | 104020912 A | 9/2014 |
| CN | 104035640 A | 9/2014 |
| CN | 1104020891 A | 9/2014 |
| EP | 27720124 A2 | 4/2014 |
| TW | 201117082 A | 5/2011 |
| TW | 201413558 A | 4/2014 |

OTHER PUBLICATIONS

Written Opinion of the International Searching Authority Appln. No. PCT/CN2014/087007, Dated Feb. 26, 2015.
International Search Report and Written Opinion mailed Feb. 26, 2015; PCT/CN2014/086813.
International Search Report and Written Opinion mailed Mar. 2, 2015; PCT/CN2014/087005.
First Chinese Office Action dated May 30, 2016; Appln. No. 201410239900.1.
First Chinese Office Action dated Jun. 23, 2016; Appln. No. 201410239897.3.
USPTO NFOA dated Jul. 28, 2016 in connection with U.S. Appl. No. 14/647,907.
USPTO NFOA dated Oct. 6, 2016 in connection with U.S. Appl. No. 14/443,594.
First Chinese Office Action dated Jul. 4, 2016; Appln. No. 201410241132.3.
USPTO NFOA dated Dec. 16, 2016 in connection with U.S. Appl. No. 14/647,907.
Second Chinese Office Action dated Nov. 18, 2016; Appln. No. 201410241132.3.
Third Chinese Office Action dated Apr. 19, 2017; Appln. No. 201410241132.3.

* cited by examiner

IN-CELL TOUCH PANEL AND DISPLAY DEVICE

TECHNICAL FIELD

Embodiments of the present invention relate to an in-cell touch screen and a display device.

BACKGROUND

With the fast development of display technology, touch screen panels have become popular in people's life gradually. At present, according to constitution structure, touch screens may be classified into add-on mode touch panels, on-cell touch panels and in-cell touch panels. For an add-on mode touch panel, the touch panel and the liquid crystal display (LCD) are produced separately and then attached together to form a liquid crystal display with touch function. Add-on mode touch panels have high manufacturing costs, low light transmission rate and great module thickness. While for an in-cell touch panel, touch electrodes of the touch panel are embedded inside the liquid crystal display, which can reduce the overall thickness of the assembly, and can drastically reduce manufacturing costs of the touch panel. Therefore, in-cell touch panels have received great attentions from panel manufacturers.

At present, an in-cell touch panel detects the touch position of a finger based on the mutual capacitance or self-capacitance principle. As for the self-capacitance principle, it is possible to provide a plurality of self-capacitance electrodes disposed in the same layer and insulated from each other in a touch panel. When a human body does not touch the screen, each self-capacitance electrode experiences capacitance of a fixed value. When the human body touches the screen, corresponding self-capacitance electrodes experience capacitance of the fixed value plus the human body capacitance. The touch sensing chip can determine the touch position by detecting the variation of the capacitance value of the self-capacitance electrodes in the touch period. Since the body capacitance can act on all the self-capacitance electrodes, as compared to the situation where the body capacity that can only act on projection capacitance in the mutual capacitance principle, the touch variation caused by the body touching action on the screen would be greater than that of the touch panel manufactured in accordance with the mutual capacitance principle.

SUMMARY

At least one embodiment of the present invention provides an in-cell touch panel and a display device to reduce production costs of in-cell touch panels and improve production efficiency.

At least one embodiment of the present invention provides an in-cell touch panel including: a first substrate and a second substrate disposed oppositely to each other, a common electrode layer comprising a plurality of strip-like slits disposed on a side of the second substrate, which side faces the first substrate, and a touch sensing chip; the common electrode layer is partitioned into a plurality of mutually independent self-capacitance electrodes along the strip-like slits and a direction crossing the strip-like slits; the touch sensing chip is configured to apply common electrode signals to the self-capacitance electrodes in a display time period and determine touch positions by detecting capacitance value variation of self-capacitance electrodes in a touch time period.

At least one embodiment of the present invention provides a display device including the above-mentioned in-cell touch panel provided in embodiments of the present invention.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

The inventors have noted that in the structure design of capacitive in-cell touch panels, new layers should be added inside display panels, leading to added new processes while manufacturing panels, increased production costs, which is disadvantageous to increasing production efficiency.

At present, liquid crystal display technologies capable of wide viewing angle mainly include In-Plane Switch (IPS) technology and Advanced Super Dimension Switch (ADS) technology. In the ADS technology, a multi-dimensional electric field is formed with both an electric field produced at edges of slit electrodes on the same plane and an electric field produced between a slit electrode layer and a plate electrode layer, so that liquid crystal molecules at all orientations, which are located directly above the electrodes and between the slit electrodes in a liquid crystal cell, can be rotated, which enhances the work efficiency of liquid crystals and increases light transmittance efficiency. The Advanced-Super Dimensional Switching technology can improve the picture quality of TFT-LCDs and has advantages of for example high resolution, high transmissivity, low power dissipation, wide viewing angles, high opening ratio, low chromatic aberration, and no push Mura, etc.

For example, on the second substrate in a traditional ADS type liquid crystal panel, a common electrode layer is located on the lower layer as plate electrodes (closer to the base substrate), a pixel electrode layer is located on the upper layer as slit electrodes (closer to the liquid crystal layer), and an insulating layer is provided between the pixel electrode layer and the common electrode layer. While on the second substrate in a high aperture ratio ADS (HADS) type liquid crystal panel, a pixel electrode layer is located on the lower layer as plate electrodes (closer to the base substrate), a common electrode layer is located on the upper layer as slit electrodes (closer to the liquid crystal layer), and an insulating layer is provided between the pixel electrode layer and the common electrode layer.

Embodiments of the present invention propose a novel capacitive in-cell touch panel structure based on H-ADS (high aperture ratio-advanced super dimension switching), which is an important improvement of ADS technology.

Thicknesses and shapes of layers in the accompanying drawings do not reflect real scale, and only serve to illustrate contents of the present invention.

Figure 1:
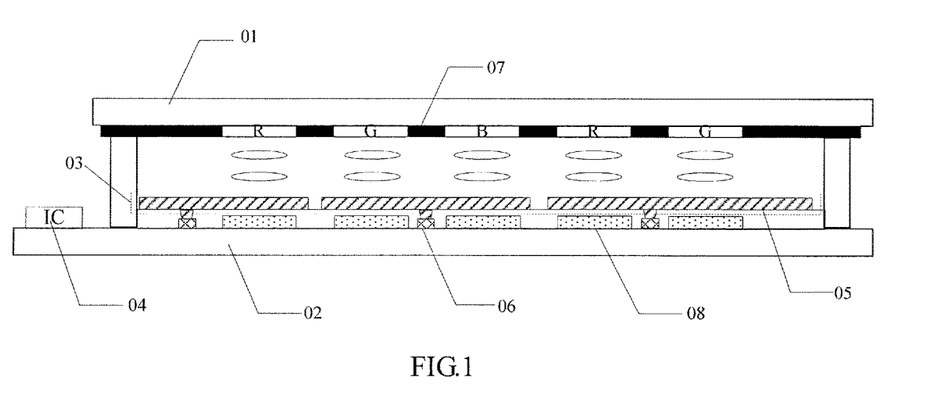
FIG. 1 is a structural view of an in-cell touch panel provided in an embodiment of the present invention.

At least one embodiment of the present invention provides an in-cell touch panel as shown in FIG. 1, including a first substrate 01 and a second substrate 02 disposed oppositely to each other, a common electrode layer 03 disposed on a side of the second substrate 02, which side faces the first substrate 01, and having strip-like slits, and a touch sensing chip (IC) 04.

Figure 2:
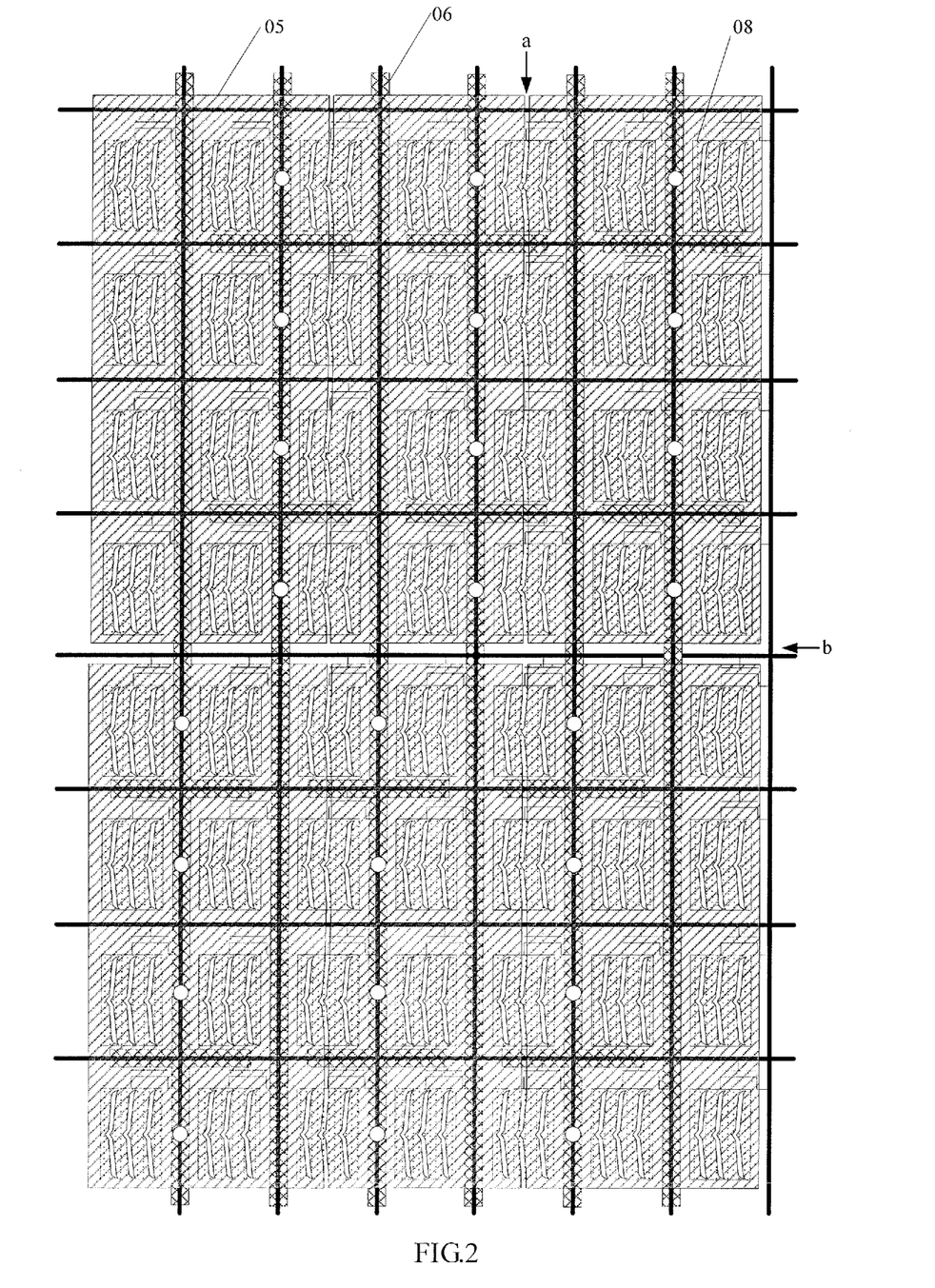
FIG. 2 is a top structural view 1 of an in-cell touch panel provided in an embodiment of the present invention.

As shown in FIG. 2, the common electrode layer 03 is divided or partitioned into a plurality of mutually independent self-capacitance electrodes 05 along strip-like slits "a" and a direction crossing the slits "a." That is, the common electrode layer 03 includes a plurality of mutually independent self-capacitance electrodes 05 distributed along strip-like slits "a" and a direction crossing the slits "a."

The touch sensing chip 04 is configured to apply common electrode signals to self-capacitance electrodes 05 in a display time period and determine touch positions by detecting capacitance value variation of self-capacitance electrodes 05 in a touch time period. In FIG. 1, the touch sensing chip 04 is mounted on the second substrate 02. However, the present invention is not limited thereto. It may also be disposed on the first substrate 01 or connected to the second substrate 02 via a flexible printed circuit board.

In the above-mentioned in-cell touch panel provided in at least one embodiment of the present invention, the common electrode layer 03 is reused or multiplexed as self-capacitance electrodes 05 based on the self-capacitance principle. The pattern of common electrode layer 03 is designed such that the common electrode layer 03 is partitioned into a plurality of mutually independent self-capacitance electrodes 05 along strip-like slits and a direction crossing the slits. The touch sensing chip 04 determines the touch position by detecting capacitance value variation of self-capacitance electrodes 5 in the touch period.

Since in the touch panel provided in at least one embodiment of the present invention, the structure of common electrode layer 03 is partitioned into self-capacitance electrodes 05, no additional process is needed on the basis of manufacturing process of an array substrate, thereby saving production costs and improving production efficiency. In partitioning the common electrode layer 03, because the common electrode layer 03 is partitioned according to strip-like slits originally provided in the common electrode layer 03, it is possible to avoid light leakage caused in cutting the common electrode layer 03 and influencing on normal display effect.

Since the above-mentioned touch panel provided in at least one embodiment of the present invention reuses the common electrode layer 03 as self-capacitance electrodes 05, in order to reduce mutual interference between display signals and touch signals, the time-division driving mode may be used for touch and display time periods. In a specific embodiment, it is also possible to integrate a display driving chip and a touch sensing chip into one chip to further reduce the production costs.

Figure 3A:
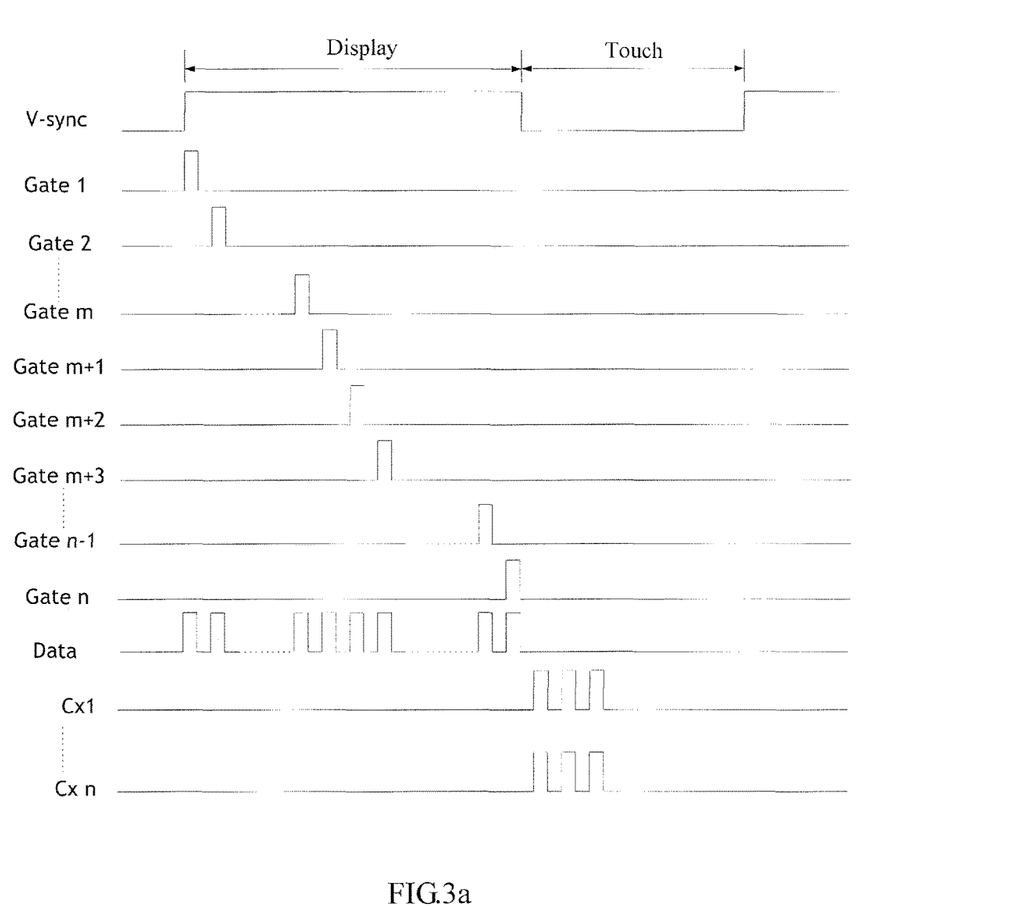
FIGS. 3a and 3b are driving time sequence diagrams of an in-cell touch panel provided in an embodiment of the present invention.
Figure 3B:
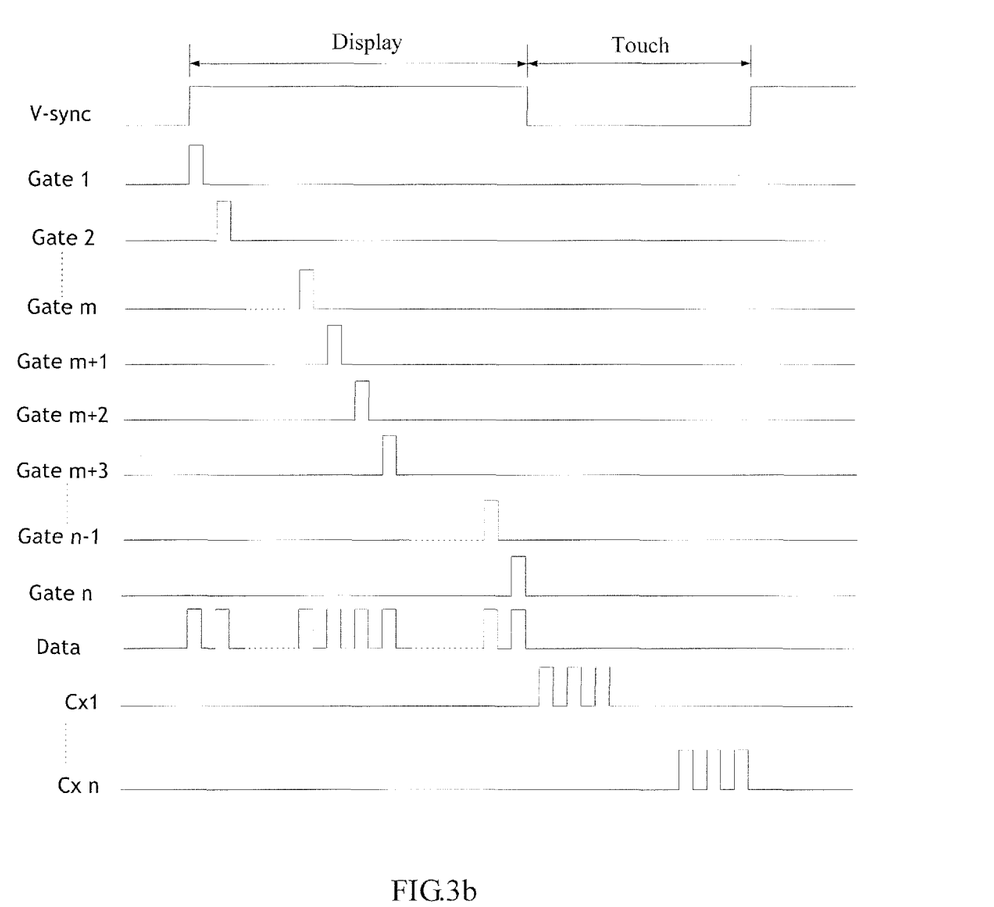

For example, in the driving timing sequence diagram shown in FIGS. 3a and 3b, the time period for the touch panel to display each frame (V-sync) is divided into a display time period (Display) and a touch time period (Touch). In the shown driving timing sequence diagram, the time period for the touch panel to display one frame is 16.7 ms in which 5 ms is selected as a touch time period and the rest 11.7 ms as a display time period. Of course it is also possible to appropriately adjust durations of both according to the processing capacity of IC chips, which is not specifically limited here. In the display time period (Display), each gate signal line Gate 1, Gate 2 . . . Gate n in the touch panel is applied with gate scanning signals successively, data signal lines Data is applied with gray scale signals, and the touch sensing chip connected with self-capacitance electrodes Cx 1 . . . Cx n applies common electrode signals to self-capacitance electrodes Cx 1 . . . Cx n respectively to implement liquid crystal display function. In the touch time period (Touch), as shown in FIG. 3a, the touch sensing chip connected with self-capacitance electrodes Cx 1 . . . Cx n applies driving signals to self-capacitance electrodes Cx 1 . . . Cx n at the same time, and receives feedback signals of self-capacitance electrodes Cx 1 . . . Cx n at the same time. As shown in FIG. 3b, it is also possible that the touch sensing chip connected with self-capacitance electrodes Cx 1 . . . Cx n applies driving signals to self-capacitance electrodes Cx 1 . . . Cx n successively, and receives feedback signals of self-capacitance electrodes Cx 1 . . . Cx n respectively. The way to apply signals is not limited herein. Touch function is implemented by analyzing feedback signals to determine whether any touch actions occur.

Generally, the resolution of a touch panel is on the order of millimeter. Therefore, it is possible to select the density of self-capacitance electrodes 05 and occupied area according to the required touch density to guarantee the required touch resolution. Generally, self-capacitance electrodes 05 are designed as square electrodes of 5 mm*5 mm. While the resolution of a display screen in generally on the order of microns. Therefore, one self-capacitance electrode 05 generally corresponds to a plurality of pixels in a display screen. Also, for the above-mentioned in-cell touch panel provided in at least one embodiment of the present invention, the common electrode layer 03 which is disposed on the second substrate 02 entirely is partitioned into a plurality of self-capacitance electrodes 05 along original strip-like slits and a direction crossing slits. Since originally there is no pattern of common electrode layer 03 at strip-like slits, provision of partitioning gaps at strip-like slits will not influence the normal display. In arranging partitioning gaps in the direction crossing strip-like slits, in order not to influence the normal display function, the partitioning gaps in the direction crossing strip-like slits should be kept away from opening regions for display and disposed in the regions for the pattern of black matrix layer.

As shown in FIG. 1, the above-mentioned touch panel provided in the embodiment of the present invention may further include a black matrix layer 07 disposed on a side of the first substrate 01, which side faces the second substrate 02, or on a side of the second substrate 02, which side faces the first substrate 01.

In the common electrode layer 03, orthogonal projections of partitioning gaps "b" in the direction crossing strip-like slits "a" on the second substrate 02 are all within regions in which the pattern of black matrix layer 07 is located.

In designing touch panel with self-capacitance principle, as shown in FIG. 2, each self-capacitance electrode 05 generally needs to be connected with the touch sensing chip 04 via a separate wire 06, that is, the touch panel generally further includes a plurality of wires 06 for connecting self-capacitance electrodes 05 to the touch sensing chip 04.

For example, it is possible to provide the patterns of wires 06 and self-capacitance electrodes 05 on the same layer, namely, dispose patterns of self-capacitance electrodes 05 and wires 06 in the common electrode layer 03. It is also possible to dispose the patterns of wires 06 and self-capacitance electrodes 05 in different layers, that is, the patterns of wires 06 is formed in a separate patterning process. Disposing of wires 06 and self-capacitance electrodes 05 on the same layer can avoid adding new patterning process. However, disposing of self-capacitance electrodes 05 and wires 06 on the same layer will produce a touch dead zone, and all the wires 06 connected with a plurality of self-capacitance electrodes 05 pass the touch dead zone. Therefore, in the touch dead zone, signals are relatively disorder, that is, touch performance in the region can not be guaranteed. In view of the above, for example, it is possible to dispose wires 06 and self-capacitance electrodes 05 on different layers.

In specific implementations, in arranging the wires 06 on the second substrate 02, as shown in FIG. 2, in order not to influence the aperture ratio of display regions, the patterns of the wires 06 are generally arranged such that orthogonal projections on the second substrate 02 are within the region where the pattern of black matrix layer 07 is located.

In the above-mentioned touch panel provided in at least one embodiment of the present invention, as shown in FIG. 1, pixel electrodes 08 are disposed between the second substrate 02 and the common electrode layer 03. For example, the layer, in which the wires 06 connected with the self-capacitance electrodes 05 in the common electrode layer 03 are located, may be disposed between the pixel electrodes 08 and the common electrode layer 03. Alternatively, the wires and the pixel electrodes 08 are disposed on the same layer, that is, the wires 06 and the self-capacitance electrodes 05 without connection with the wires respectively are isolated by the insulating layer between the pixel electrodes 08 and the common electrode layer 03, and via holes in the insulating layer are used to connect the wires 06 and the self-capacitance electrodes 05 corresponding to the wires. For example, the patterns of wires 06 are formed after forming the patterns of the pixel electrodes 08. Alternatively, the patterns of the pixel electrodes 08 and the wires 06 are formed at the same time, and then the patterns of the insulating layer and the common electrode layer 03 are formed successively. The patterns of the wires 06 may be configured in a transverse strip-like structure, or a longitudinal strip-like structure, or a crossing mesh structure as shown in FIG. 2, which may be designed according to practical parameters and is not limited herein.

Figure 4:
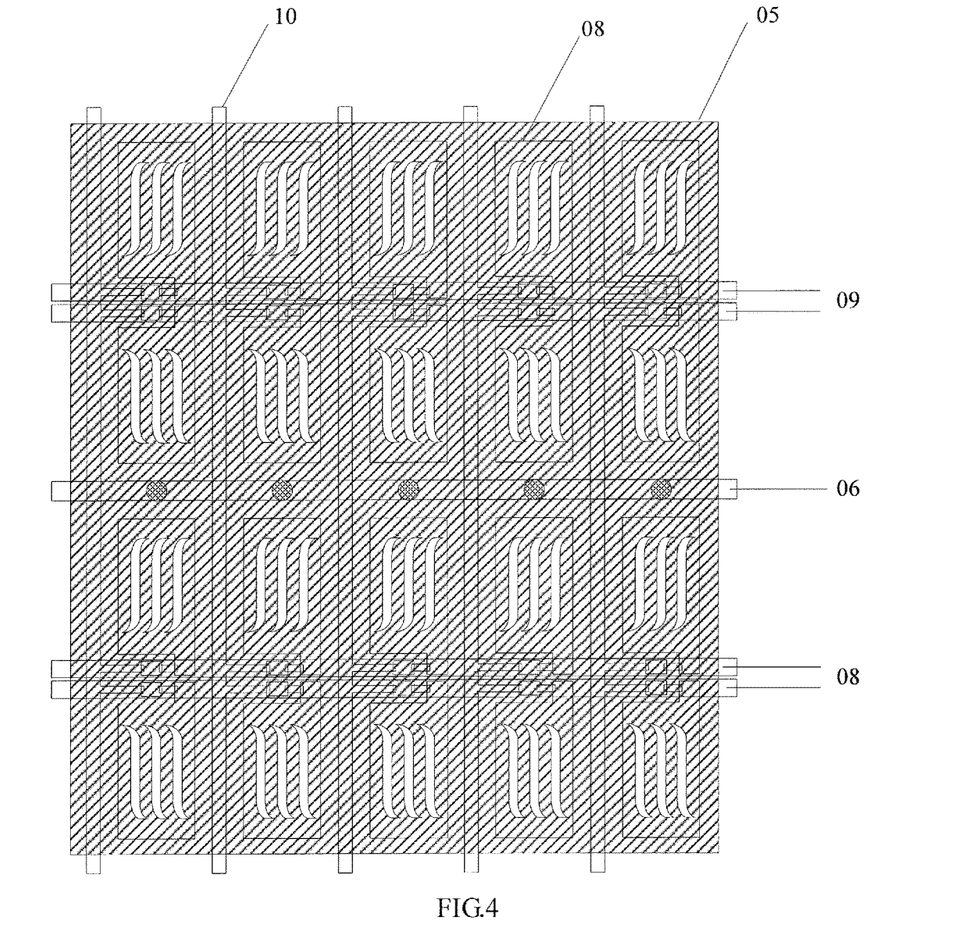
FIGS. 4 and 5 are top structural views II of an in-cell touch panel provided in an embodiment of the present invention respectively.
Figure 5:
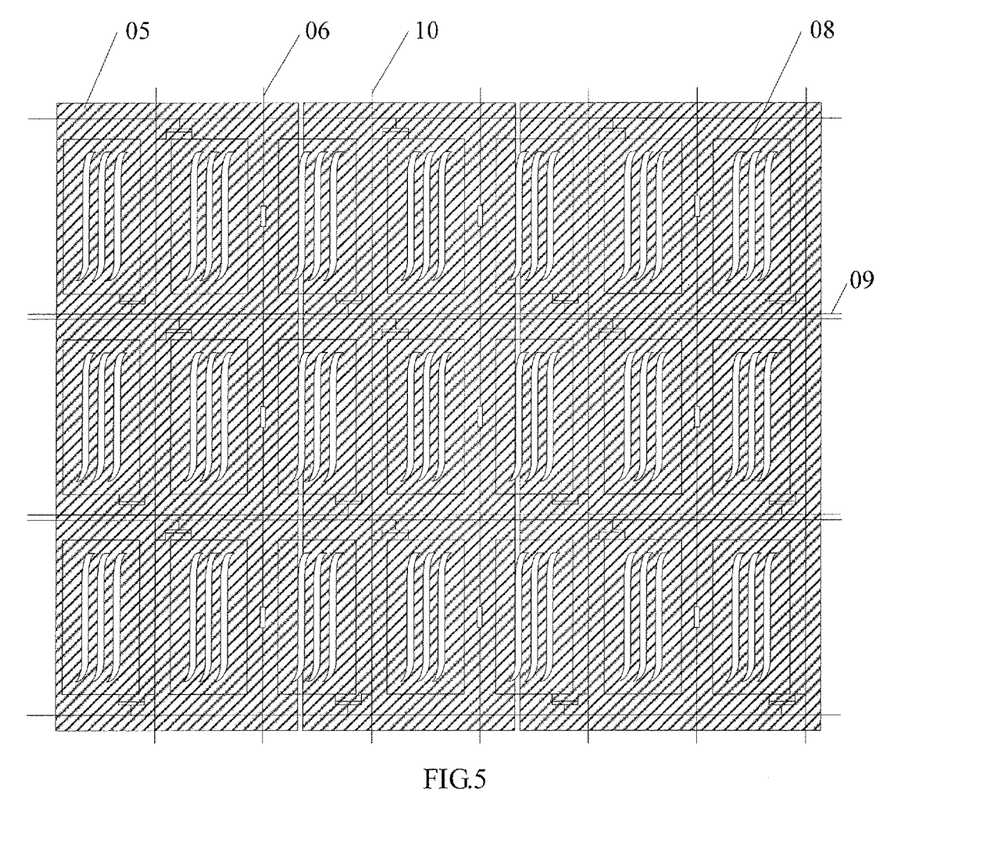

Furthermore, as shown in FIGS. 4 and 5, the above-mentioned touch panel provided in at least one embodiment of the present invention may further include gate signal lines 09 and data signal lines 10 intersecting each other and disposed on a side of the second substrate 02, which side faces the first substrate 01. Adjacent two gate signal lines 09 and adjacent two data signal lines 10 enclose a sub-pixel. Each sub-pixel further includes a thin film transistor as a switching element, in which for example the drain electrode of thin film transistor is electrically connected with the pixel electrode of the sub-pixel. Gate signal lines 09, data signal lines 10 and thin film transistors constitute an array structure.

In order to facilitate the connection between the self-capacitance electrodes 05 and the touch sensing chip 04 through the wires 06, generally, the extension direction of the wires 06 is configured to be the same as that of the gate signal lines 09 or the data signal lines 10. That is, the extension direction of the wires 06 is generally consistent with each other.

Furthermore, in the touch panel provided in at least one embodiment of the present invention, in order to not add any new layer as much as possible, and in order to guarantee production efficiency and reduce production costs, in specific operations, it is possible to the dispose wires 06 connected with the self-capacitance electrodes 05 respectively on the same layer as the gate signal lines 09 or on the same layer as the data signal lines 10.

One illustrative example is as follows. As shown in FIG. 4, on the second substrate 02, taking every two adjacent rows of pixels as one pixel group, two gate signal lines 09 are provided between these two rows of pixels for providing gate scanning signals to the two rows of pixels respectively. In this way, the position of one gate signal line 09 originally between adjacent pixel groups can be left by changing positions of the gate signal lines 09 and the TFTs between two adjacent rows of pixels. Thus, as shown in FIG. 4, it is possible to dispose wires 06 at gaps between adjacent pixel groups and on the same layer as the gate signal lines 09. The wires 06 are electrically connected with the corresponding self-capacitance electrodes 05 through via holes.

Another illustrative example is as follows. As shown in FIG. 5, a dual-gate structure is adopted in which on the second substrate 02, two gate signal lines 09 are provided between adjacent rows of pixels and every two adjacent columns of pixels are taken as one pixel group and share the data signal line 10 between these two columns of pixels. By doubling the number of gate signal lines 09, it is possible to save the position for the data signal line 10 originally between adjacent pixel groups. Thus, as shown in FIG. 5, it is possible to dispose wires 06 at gaps between adjacent pixel groups and on the same layer as the data signal line 10. The wires 06 are electrically connected with the corresponding self-capacitance electrodes 05 through via holes.

Figure 6:
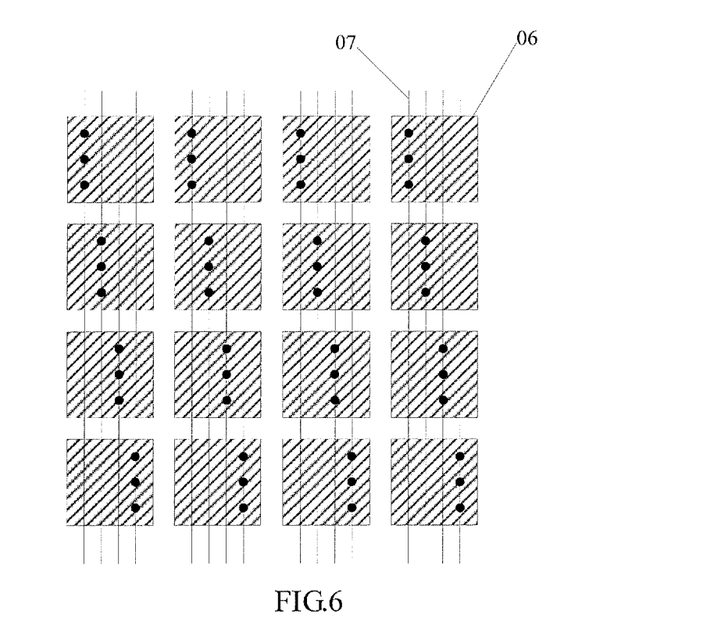
FIGS. 6 and 7 are top structural views III of an in-cell touch panel provided in an embodiment of the present invention respectively.

Since the pixel electrode layer is generally made of an ITO material while the ITO material has high resistance, in order to reduce its resistance to the largest extent and improve signal-to-noise ratio for the self-capacitance electrodes 05 to transmit electrical signals, it is possible to electrically connect self-capacitance electrodes 05 with corresponding wires 06 through a plurality of via holes, as shown in FIG. 6. This is equivalent to connect the ITO electrodes with a plurality of metallic resistors made of wires in parallel and can reduce the overall resistance to the largest extent, thereby improving signal-to-noise ratio of transmitting signals by electrodes.

Figure 7:
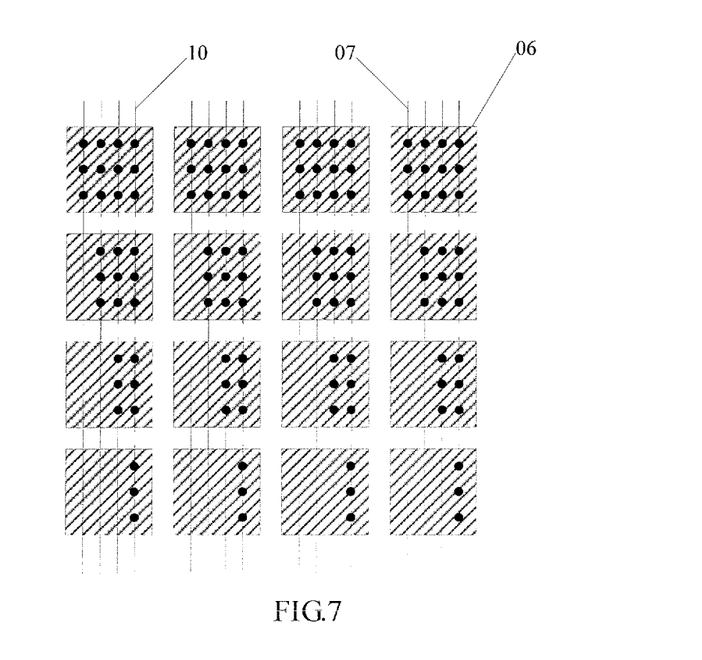

Furthermore, in order to further reduce the overall resistance of self-capacitance electrodes 05, in designing the wires 06, as shown in FIG. 7, while realizing the electrical connection between the wires 06 and the self-capacitance electrodes 05 corresponding to them, it is also possible to break one entire wire extending through the entire panel to form a wire 06 and a plurality of metal wires 11 disposed on the same layer as but insulated from wires 06. The metal wires 11 are in the same direction line as wires 06, and each is electrically connected in parallel with one self-capacitance electrode 05 overlapping with it, namely electrically connected through via holes. The above-mentioned design can take full advantage of gaps between adjacent groups of pixels to dispose metal wires with low resistance value. This configuration utilizes the redundant parts of wires while guaranteeing the aperture ratio of the touch panel, and by connecting the metal wires with low resistance value with self-capacitance electrodes with high resistance value in parallel, the resistance of self-capacitance electrodes can be reduced to the largest extent.

In the in-cell touch panel provided in at least one embodiment of the present invention, because the body capacitance acts on the self-capacitance of self-capacitance electrodes 05 in a direct coupling manner, when a human body touches the screen, only the self-capacitance electrode 05 under the touch position experiences large variation of capacitance value, while self-capacitance electrodes 05 adjacent to the self-capacitance electrode 05 directly under the touch position experience very small variation of capacitance values. In this case, while the touch point slides on the touch panel, the touch coordinates in the regions where self-capacitance electrodes 05 are located may be not determined. In order to solve this problem, in the above-mentioned in-cell touch panel provided in at least one embodiment of the present invention, it is possible to configure opposite sides of adjacent two self-capacitance electrodes 05 as bend lines so as to increase capacitance value variation of self-capacitance electrodes 05 adjacent to the self-capacitance electrode 05 directly under the touch position.

For example, it is possible to configure the overall shape of self-capacitance electrodes 05 in one of or combination of the following ways.

Figure 8A:
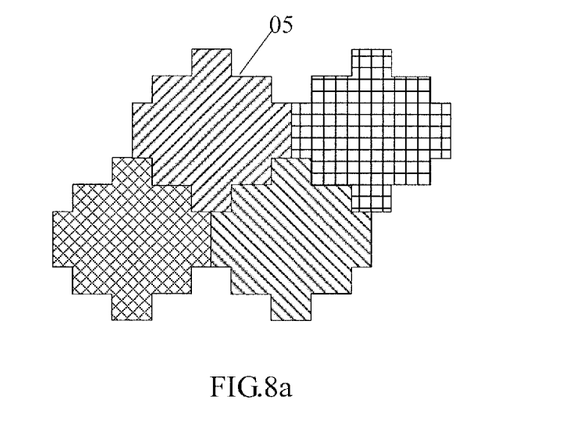
FIGS. 8a and 8b are structural views showing adjacent self-capacitance electrodes having opposite sides configured as bend lines in the in-cell touch panel provided in an embodiment of the present invention respectively.

1. It is possible to configure the opposite sides of two adjacent self-capacitance electrodes 05 that are bend lines as step-like structures such that two step-like structures have consistent and matching structural shapes as shown in FIG. 8a that shows 2*2 self-capacitance electrodes 05.

Figure 8B:
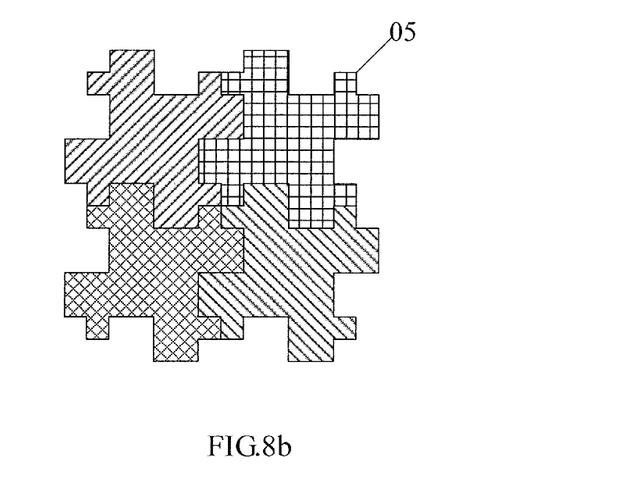

2. It is possible to configure the opposite sides of two adjacent self-capacitance electrodes 05 that are bend lines as concave-convex structures such that two concave-convex structures have consistent and matching structural shapes as shown in FIG. 8b that shows 2*2 self-capacitance electrodes 05.

For example, in the above-mentioned touch panel provided in an embodiment of the present invention, it is possible to adopt any existing patterning process flow to manufacture layers on the second substrate 02. For example, eight (8) patterning processes may used: gate and gate line patterning→active layer patterning→first insulating layer patterning→data line and source/drain patterning→resin layer patterning→pixel electrodes patterning→second insulating layer patterning→common electrode layer patterning. Of course, seven (7) patterning processes, six (6) or five (5) patterning processes may be used as well according to practical designs, which is not limited herein.

At least one embodiment of the present invention further provides a display device including the above-mentioned in-cell touch panel. The display device may be any product or component having display function such as a cellphone, a tablet computer, a TV set, a display, a notebook computer, a digital picture frame, a navigator or the like. The above-mentioned embodiments of the in-cell touch panel may be applied for implementations of the display device and repetitions will not be described any more.

For the above-mentioned in-cell touch panel and display device provided in at least one embodiment of the present invention, the common electrode layer is reused as self-capacitance electrodes in accordance with self-capacitance principle, and the pattern of common electrode layer is designed such that the common electrode layer is partitioned into a plurality of mutually independent self-capacitance electrodes along strip-like slits and a direction crossing the strip-like slits in the common electrode layer; and the touch sensing chip can determine touch positions by detecting capacitance value variation of the self-capacitance electrodes in a touch time period. Since in the touch panel provided in embodiments of the present invention, the common electrode layer is partitioned into self-capacitance electrodes, no additional process is needed on the basis of manufacturing process of an array substrate, thereby saving production costs and improving production efficiency.

For partitioning the common electrode layer, the common electrode layer is partitioned according to strip-like slits originally provided in the common electrode layer, it is possible to avoid light leakage caused by cutting the common electrode layer and influence on normal display effect.

What are described above is related to the illustrative embodiments of the disclosure only and not limitative to the scope of the disclosure; the scopes of the disclosure are defined by the accompanying claims.

The present application claims priority of China Patent application No. 201410241132.3 filed on May 30, 2014, the content of which is incorporated in its entirety as part of the present application by reference herein.

The invention claimed is:

1. An in-cell touch panel comprising:
a first substrate and a second substrate disposed oppositely to each other, a common electrode layer comprising a plurality of strip-like slits disposed on a side of the second substrate, which side faces the first substrate, and a touch sensing chip; wherein
the common electrode layer comprises a plurality of mutually independent self-capacitance electrodes distributed along the strip-like slits and a direction crossing the strip-like slits; and
the touch sensing chip is configured to apply common electrode signals to the self-capacitance electrodes in a display time period and determine touch positions by detecting capacitance value variation of self-capacitance electrodes in a touch time period;
further comprising:
a black matrix layer disposed on a side of the first substrate, which side faces the second substrate, or on a side of the second substrate, which side faces the first substrate;
and in the common electrode layer, orthogonal projections of partitioning gaps in the direction crossing the strip-like slits on the second substrate are all within regions in which a pattern of the black matrix layer is located;
a plurality of wires connecting the self-capacitance electrodes to the touch sensing chip; wherein the wires and the self-capacitance electrodes are disposed on different layers; and
pixel electrodes disposed between the second substrate and the common electrode layer; wherein a layer where the wires are located is disposed between the pixel electrodes and the common electrode layer or on a same layer as the pixel electrodes;
wherein opposite sides of adjacent two of self-capacitance electrodes are both configured as bend lines.

2. The in-cell touch panel of claim 1, wherein orthogonal projections of patterns of the wires on the second substrate are located in the region where the pattern of the black matrix layer is located.

3. The in-cell touch panel of claim 1, further comprising: gate signal lines and data signal ones crossing each other and disposed on a side of the second substrate, which side faces the first substrate;

wherein adjacent two gate signal lines and data signal lines enclose a pixel; and an extension direction of the wires is same as that of the gate signal lines or the data signal lines.

4. The in-cell touch panel of claim 3, wherein every two adjacent rows of pixels constitute a pixel group and two gate signal lines for providing gate scanning signals respectively for these two rows of pixels are provided between these two rows of pixels; and the wires are disposed at gaps between adjacent pixel groups and on a same layer as the gate signal lines.

5. The in-cell touch panel of claim 3, wherein two gate signal fines are provided between adjacent rows of pixels; and every two adjacent columns of pixels as one pixel group share one data signal line between these two columns of pixels; and the wires are disposed at gaps between adjacent pixel groups and on a same layer as the data signal lines.

6. The in-cell touch panel of claim 1, wherein the skies that are bend lines are of step-like structures such that two step-like structures are consistent and matching each other.

7. The in-cell touch panel of claim 1, wherein the sides that are bend lines are of concave-convex structures such that two concave-convex structures are consistent and matching each other.

8. A display device comprising the in-cell touch panel of claim 1.

9. The in-cell touch panel of claim 1, wherein the sides that are bend lines are of concave-convex structures such that two concave-convex structures are consistent and matching each other.

* * * * *